(12) United States Patent
Ravishankar et al.

(10) Patent No.: US 9,242,863 B2
(45) Date of Patent: Jan. 26, 2016

(54) PROCESS AND REAGENTS FOR THE INHIBITION OR REDUCTION OF SCALE FORMATION DURING PHOSPHORIC ACID PRODUCTION

(75) Inventors: Sathanjheri A. Ravishankar, Shelton, CT (US); Bing Wang, Brookfield, CT (US)

(73) Assignee: CYTEC TECHNOLOGY CORP., Wilmington, DE (US)

( * ) Notice: Subject to any disclaimer, the term of this patent is extended or adjusted under 35 U.S.C. 154(b) by 665 days.

(21) Appl. No.: 12/888,853

(22) Filed: Sep. 23, 2010

(65) Prior Publication Data

US 2011/0076218 A1  Mar. 31, 2011

Related U.S. Application Data

(60) Provisional application No. 61/245,746, filed on Sep. 25, 2009.

(51) Int. Cl.
*C01B 25/16* (2006.01)
*C01B 25/22* (2006.01)

(52) U.S. Cl.
CPC ...................................... *C01B 25/22* (2013.01)

(58) Field of Classification Search
None
See application file for complete search history.

(56) References Cited

U.S. PATENT DOCUMENTS

| | | | | |
|---|---|---|---|---|
| 3,062,612 A | * | 11/1962 | Le Boucher | 422/12 |
| 3,251,778 A | * | 5/1966 | Dickson et al. | 134/22.19 |
| 3,258,428 A | * | 6/1966 | Dickson et al. | 252/180 |
| 3,317,431 A | * | 5/1967 | Kaye | 252/180 |
| 3,553,101 A | * | 1/1971 | Zisis | 208/47 |
| 3,714,330 A | | 1/1973 | Barker | |
| 3,796,790 A | | 3/1974 | Sirianni et al. | |
| 3,835,215 A | | 9/1974 | Marquis et al. | |
| 3,931,038 A | * | 1/1976 | Mochi-Bartolani et al. | 252/181 |
| 3,972,981 A | * | 8/1976 | Harper et al. | 423/320 |
| 4,049,774 A | | 9/1977 | Harper et al. | |
| 4,221,769 A | | 9/1980 | Harper et al. | |
| 4,277,359 A | | 7/1981 | Lipinski | |
| 4,327,061 A | | 4/1982 | Hermann et al. | |
| 4,554,090 A | * | 11/1985 | Jones | 252/181 |
| 4,563,284 A | * | 1/1986 | Amjad | 210/699 |
| 4,952,327 A | | 8/1990 | Amjad et al. | |
| 4,986,970 A | | 1/1991 | Haraldsen | |
| 5,022,926 A | * | 6/1991 | Kreh et al. | 134/2 |
| 5,080,801 A | | 1/1992 | Molter et al. | |
| 5,120,519 A | | 6/1992 | Gross | |
| 5,256,303 A | * | 10/1993 | Zeiher et al. | 210/700 |
| 5,456,767 A | * | 10/1995 | Shah et al. | 148/251 |
| 5,575,920 A | * | 11/1996 | Freese et al. | 210/697 |
| 5,764,717 A | * | 6/1998 | Rootham | 376/316 |
| 5,993,668 A | | 11/1999 | Duan | |

FOREIGN PATENT DOCUMENTS

| | | |
|---|---|---|
| CN | 1724965 A | 1/2006 |
| CN | 1762857 A | 4/2006 |
| EP | 0271035 B1 | 9/1993 |
| EP | 0677485 A1 | 10/1995 |
| GB | 1406884 | 9/1975 |
| GB | 1433123 | 4/1976 |
| GB | 2424876 A | 10/2006 |
| JP | 2002263690 A | 9/2002 |
| WO | 2004083118 A1 | 9/2004 |
| WO | 2009148866 A1 | 12/2009 |
| WO | 2011038108 A1 | 3/2011 |
| WO | 2011038167 A1 | 3/2011 |
| WO | 2012128755 A1 | 9/2012 |

OTHER PUBLICATIONS

International Search Report and Written Opinion for PCT/US2010/049983, mailing date of Feb. 4, 2011.
International Search Report and Written Opinion for PCT/US2010/050086, mailing date of Feb. 10, 2011.
International Search Report and Written Opinion for PCT/2011/029319, mailing date of Dec. 5, 2011.
A. William Frazier et al., Chemical Behavior of Fluorine in Production of Wet-Process Phosphoric Acid; Environmental Science & Technology; vol. 11; No. 10; 1977; pp. 1107-1014.
Lin-Jun Yang et al., "Effect of Scale Inhibitor-Dispersant on the Crystallization of Potassium (Sodium) Fluosilicate;" Chemical Industry and Engineering; vol. 19, No. 1, 2002 (abstract).
A.D. Pandey et al., Prevention of Scale Deposition on Heat Exchanger Surfaces by Use of High Intensity Ultrasonic Waves during Concentration of Wet Process Phosphoric Acid; Fertiliser News; 28 (6); 1983, pp. 45-48.
Chuhua Wang, et al., Enhanced Solubility of Sodium Fluorosilicate Scale by Magnetic Treatment, Florida Scientist; 1998; vol. 6 (1) pp. 17-25.
El-Shall H. et al., "Decreasing Iron Content in Wet-Process Phosphoric Acid: Final Report;" Florida Institute of Phosphate Research; Publication No. 01-154-171; Feb. 2001.
Final Office Action of U.S. Appl. No. 13/053,988, mailing date of Mar. 28, 2013.
Office Action of U.S. Appl. No. 12/888,861, mailing date of Oct. 5, 2012.
Office Action of U.S. Appl. No. 13/053,988, mailing date of Jul. 19, 2012.

* cited by examiner

*Primary Examiner* — Patricia L Hailey
*Assistant Examiner* — Michael Forrest
(74) *Attorney, Agent, or Firm* — Charles E. Bell

(57) ABSTRACT

Processes and reagents for inhibiting or eliminating scale formation during wet-process phosphoric acid production are provided and include adding to a wet-process phosphoric acid production stream a scale inhibiting amount of a reagent having an aliphatic or aromatic compound containing at least two hydroxy groups, and at least one amine.

24 Claims, 1 Drawing Sheet

PROCESS AND REAGENTS FOR THE INHIBITION OR REDUCTION OF SCALE FORMATION DURING PHOSPHORIC ACID PRODUCTION

CROSS-REFERENCE TO RELATED APPLICATIONS

This application claims benefit of priority from U.S. Provisional Application No. 61/245,746, filed Sep. 25, 2009 the content of which is incorporated herein by reference in its entirety.

This application is also related to, without benefit of priority, U.S. application Ser. No. 12/888,861, filed Sep. 23, 2010, and U.S. application Ser. No. 13/053,988, filed Mar. 22, 2011.

BACKGROUND

1. Field of the Invention

The present invention relates to processes and reagents for inhibiting or reducing scale formation in and/or on process equipment throughout various stages of phosphoric acid production.

2. Description of the Related Art

The wet process is the most commonly used process in phosphoric acid production. In the wet process, phosphate rocks, which contain mostly calcium phosphate, are cleaned in a wash plant and ground in a Ball mill before being fed into a series of reactors for digestion with sulfuric acid along with recycled phosphoric acid from the process. The digestion temperature typically ranges from 40° C. to 80° C. After completing the reaction series, the process stream is washed with evaporator condensate while being forced through a filter.

After digestion, the reaction slurry is filtered to separate phosphoric acid from Gypsum (calcium sulfate). The filtered crude phosphoric acid is then sent to the clarifiers and the evaporators for further purification and concentration. The purified phosphoric acid is either sent out as 28% Merchant Grade Acid (MGA) or continued to make 69% $P_2O_5$ Super Phosphoric Acid (SPA). The Gypsum is washed and dried before being sold for commercial uses. Some of the crude phosphoric acid is concentrated to 44% ($P_2O_5$) before sent for Monoammonium Phosphate (MAP), Diammonium Phosphate (DAP) and ammonium phosphate-sulfate (APS) production.

Due to the supersaturated nature of the acid and the impurities in the phosphate ores, the concentration steps with respect to $P_2O_5$ render several side reactions, causing scale formation at different stages of the phosphoric acid production. For example, fluorosilicate is one of the more common scale species found in phosphoric acid production. It can be depicted by the following equations:

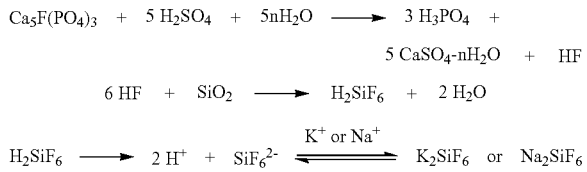

More than 12-15 other types of scaling species can be found throughout phosphoric acid production and they have provided significant challenges for the industry. Plants producing phosphoric acid normally have to shut down production every few weeks to physically clean off the scales either using high pressure water or other mechanical means. The economic impact for the scale-related issues is substantial, and the industry is in need of a more efficient scale prevention technology than the existing physical means of post scale formation removal.

Conceptually, there are two basic types of approaches scale removal from the phosphoric acid production process—namely, the physical method and the chemical method. There are several options for the physical method. In addition to the previously mentioned mechanical and water wash method, magnetic separation (Wang, Chuhua; Benson, Robert F.; Martin, Dean F. *Enhanced solubility of sodium fluorosilicate scale by magnetic treatment*, Florida Scientist (1998), 61(1), 17-25) and ultrasonic methods (Pandey, A. D.; Mallick, K. K.; Pandey, P. C.; Varma, S. *Prevention of scale deposition on heat exchanger surfaces by use of high intensity ultrasonic waves during concentration of wet process phosphoric acid*, Fertiliser News (1983), 28(6), 45-8) have also been used as part of the physical approach. Another approach still, is available by using physically smoothed piping in phosphoric acid production (See DE 3039187). Among all these options, chemical treatment methods for scale inhibition appear to be more practical and efficient. Typically, chemical methods require limited amounts of capital investment and have the potential not to alter the existing process in the phosphoric acid plants. Processes and reagents that do not require large amounts of reagent and therefore have minimal environmental and downstream impact are also preferable.

Although there have been numerous attempts to address the scale problem in boiler water systems (for example, copolymers of acrylic acid and 2-acrylamido-2-methylpropane sulfonic acid (AMPS) were reported to reduce the amount silica gel adhering to the wall of the testing bottles in EP0271035. These polymers were reported to reduce the amount of silica gel adhering to the wall of the testing bottles. Other systems such as polyamine, phosphonic acid and carboxylic acid based monomers and polymers have also been reported to show effectiveness in scale removal in boiler water system (for examples, see GB2424876, JP2002263690, EP0677485), the environment found in boiler water systems differs vastly from that found in the wet phosphoric acid production. The boiler water systems typically have mild conditions with pH in the range of 8 to 9 and low concentrations of dissolved salts. In direct contrast, the wet phosphoric acid process normally contains harsh condition with low pH and high solids content. In addition, the scale formed in phosphoric acid plants has much more complicated components—more than 15 known species, such as $Na_2SiF_6$, $K_2SiF_6$, $CaSiF_6.2H_2O$, $CaF_2$, $MgF_2$, $CaSO_4.2H_2O$ (Gypsum), $MgSiF_6.6H_2O$, $Mg_{0.8}Al_{1.5}F_6.XH_2O$, $MgH_2P_6O_7$, $CaSO_4$, $Al(PO_3)_3$, $NaK_2AlF_6$, $Ca_3(AlF_6)_2.4H_2O$, $MgNaAlF_6.2H_2O$, $Ca_4SO_4AlSiF_{13}.10H_2O$ (see for example, A. William Frazier, James R. Lehr, and Ewell F. Dillard, Environmental Science 8. Technology, 11, 1007, 1977). Moreover, different phosphoric acid plants experience different types of scales and even within one plant, the type of scale can differ greatly from one location to the other. With such a complicated scale system, it becomes a great challenge to develop scale inhibition reagents for phosphoric acid plants.

Not surprisingly, there is very little information addressing the phosphoric acid plant scale issue in an industrial setting. Even in the academic context, the results are scattered. For example, several articles mention reagents for fluorosilicate inhibition in phosphoric acid production. (see for example, L. Yang, Zhang Y., Huang, Y. Chemical Industry and Engineering (China), (2002), V 19(1), 1). A Chinese patent (CN1762857) reports that mixtures of copolymers such as polyacrylic acid and polymaleic acid, polysulfonates, plus phosphonates and a tetraalkyl ammonium chloride combination reduces scale formation in wet process phosphoric acid production. A US patent (U.S. Pat. No. 5,120,519) teaches that high molecular weight polyacrylamide and polyacrylic acid can prevent scale from adhering on the surface of the phosphate rock and phosphoric acid. However, the use of most these chemicals are not new and have been applied water treatment systems for scale control and the mechanism of these reagents is based mostly on their dispersant effect.

Accordingly, the compositions and methods presently available for preventing and/or reducing scale in the phosphoric acid production process require further improvement. Compositions and formulations that effectively prevent and/or reduce scale, thereby enabling the phosphoric acid production plant to run longer without shutting down to remove scale would be a useful advance in the art and could find rapid acceptance in the industry.

SUMMARY OF THE INVENTION

The present invention addresses the aforementioned problems by providing water-soluble functional organic reagents and processes to reduce or eliminate scaling in a wet-process phosphoric acid production stream. When the proper reagent or combination of reagents is applied in plants producing phosphoric acid, it reduces or even completely prevents the scale from forming on equipment used in such plants. Moreover, the present materials are effective at relatively low treatment concentrations making them economically viable. Such reagents and processes extend the production time for making phosphoric acid by reducing the frequency of the washing/shut down time to remove scale, thereby improving the overall productivity of the equipment and plant.

Accordingly, in one aspect the invention provides a process for inhibiting or eliminating scale formation during wet-process phosphoric acid production by adding to a wet-process phosphoric acid production stream a scale inhibiting amount of a reagent having from about 10 to about 1000 grams per ton of $P_2O_5$ by weight of an aliphatic or aromatic compound containing at least two hydroxy groups, and from about 10 to about 1000 grams per ton of $P_2O_5$ by weight of at least one amine.

In certain embodiments, the reagent further includes a polymer. Polymers or copolymers suitable for use with the present invention include, but are not limited to, polyethyleneimine or derivatives thereof (such as MAXHT®-500 available from Cytec Industries Inc., Woodland Park N.J.); polyamines (such as Cytec SUPERFLOC® C573, or derivatives thereof (such as the poly(diallyldimethylammonium chloride SUPERFLOC® C587 available from Cytec Industries Inc., Woodland Park N.J.)); polyacrylic acid or derivatives thereof (such as, CYANAMER® P-70, or P80 available from Cytec Industries Inc., Woodland Park N.J.), and polymaleic anhydride-co-acrylic acid (MA-AA).

In another aspect, the invention provides a process for inhibiting or eliminating scale formation during wet-process phosphoric acid production by adding a scale inhibiting amount of a reagent chosen from: SUPERFLOC® C573, C587; polyethyleneimine oligomer; MAXHT®-500; and combinations thereof.

These and other objects, features and advantages of this invention will become apparent from the following detailed description of the various aspects of the invention taken in conjunction with the accompanying Examples.

DETAILED DESCRIPTION OF CERTAIN EMBODIMENTS OF THE INVENTION

Figure 1A:
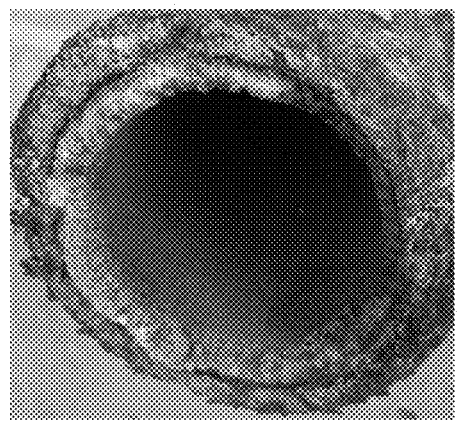
FIG. 1: Photographs of pipe segments (spools) above the Clarifier unit, which are coming from the filtrate solution at a wet-process phosphoric acid production plant. (A) Spool from wet-process phosphoric acid production stream before addition of a reagent according to the invention. Scale formation is noticeable inside the pipe and at the outside edge; (B) same spool as in FIG. 1(A) after treatment with a reagent according to the invention. The scale formation inside the pipe and at the edge is much less noticeable.
Figure 1B:
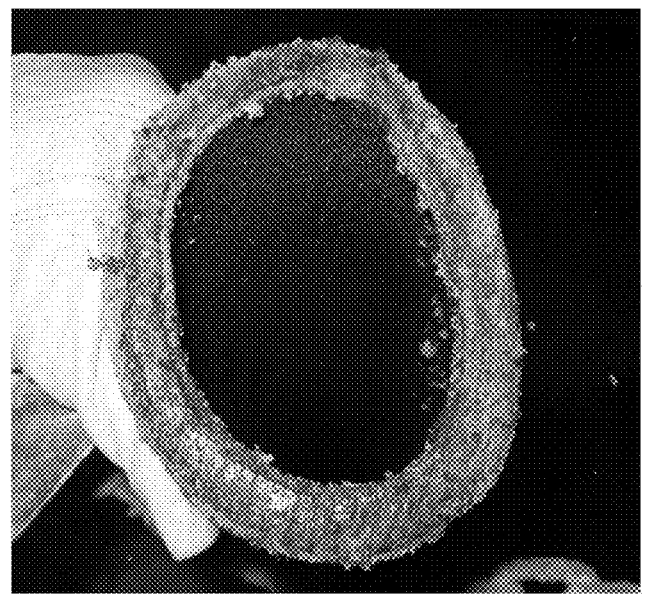

As summarized above, the present invention is based in part on the use of water-soluble functional organic reagents for use in preventing or reducing scale formed in and/or on the production equipment in the phosphoric acid production process.

DEFINITIONS

As employed above and throughout the disclosure, the following terms are provided to assist the reader. Unless otherwise defined, all terms of art, notations and other scientific or industrial terms or terminology used herein are intended to have the meanings commonly understood by those of skill in the chemical arts. In some cases, terms with commonly understood meanings are defined herein for clarity and/or for ready reference, and the inclusion of such definitions herein should not necessarily be construed to represent a substantial difference over the definition of the term as generally understood in the art unless otherwise indicated. As used herein and in the appended claims, the singular forms include plural referents unless the context clearly dictates otherwise.

Throughout this specification, the terms and substituents retain their definitions. A comprehensive list of abbreviations utilized by organic chemists (i.e. persons of ordinary skill in the art) appears in the first issue of each volume of the *Journal of Organic Chemistry*. The list, which is typically presented in a table entitled "Standard List of Abbreviations" is incorporated herein by reference.

"Alkyl" is intended to include linear, branched, or cyclic hydrocarbon structures and combinations thereof. A combination would be, for example, cyclopropylmethyl. Lower alkyl refers to alkyl groups of from 1 to 10 carbon atoms, preferably 1 to 8 carbon atoms, and more preferably from 1 to 6 carbon atoms. Examples of lower alkyl groups include methyl, ethyl, n-propyl, isopropyl, butyl, sec- and tert-butyl and the like. Preferred alkyl groups are those of $C_{20}$ or below. Cycloalkyl is a subset of alkyl and includes cyclic hydrocarbon groups of from 3 to 10 carbon atoms, and preferably from 3 to 6 carbon atoms. Examples of cycloalkyl groups include c-propyl, c-butyl, c-pentyl, norbornyl and the like.

The term "aryl" includes an aromatic hydrocarbon radical of 4 to about 20 carbon atoms, preferably from 6 to about 12 carbon atoms, more preferably 6 to about 10 carbon atoms. Examples of suitable aromatic hydrocarbon radicals include, but are not limited to, phenyl and naphthyl.

"Arylalkyl" refers to a substituent in which an aryl residue is attached to the parent structure through an alkyl. Examples are benzyl, phenethyl and the like.

Substituted alkyl, aryl, cycloalkyl, heterocyclyl, etc. refer to alkyl, aryl, cycloalkyl, or heterocyclyl wherein up to three H atoms in each residue are replaced with, for example, halogen, haloalkyl, alkyl, acyl, alkoxyalkyl, hydroxylower-alkyl, phenyl, heteroaryl, benzenesulfonyl, hydroxy, lower-alkoxy, haloalkoxy, carboxy, carboalkoxy (also referred to as alkoxycarbonyl), alkoxycarbonylamino, carboxamido (also referred to as alkylaminocarbonyl), cyano, carbonyl, acetoxy, nitro, amino, alkylamino, dialkylamino, mercapto, alkylthio, sulfoxide, sulfone, sulfonylamino, acylamino, amidino, aryl, benzyl, heterocyclyl, phenoxy, benzyloxy, heteroaryloxy, hydroxyimino, alkoxyimino, oxaalkyl, aminosulfonyl, trityl, amidino, guanidino, ureido, and benzyloxy.

The term "halogen" means fluorine, chlorine, bromine or iodine, and the term "halide" refers to a halogen with an element or radical.

The term "copolymer" as used herein refers to a polymer composed of two or more different monomers, wherein the monomers are linked randomly or in repeating sequences, or in blocks, or as side chains off the main chain.

As used herein, and as would be understood by the person of skill in the art, the recitation of "a reagent" or "compound" is intended to include salts and solvates of that reagent as well as any stereoisomeric form, or a mixture of any such forms of that reagent in any ratio.

When the reagents of the present invention are basic, salts may be prepared from acceptable non-toxic acids including inorganic and organic acids. Suitable acid addition salts for the reagents of the present invention include acetic, benzene-sulfonic (besylate), benzoic, camphorsulfonic, citric, ethene-sulfonic, fumaric, gluconic, glutamic, hydrobromic, hydro-chloric, isethionic, lactic, maleic, malic, mandelic, methanesulfonic, mucic, nitric, pamoic, pantothenic, phos-phoric, succinic, sulfuric, tartaric acid, p-toluenesulfonic, and the like. When the reagents contain an acidic side chain, suitable acceptable base addition salts for the reagents of the present invention include metallic salts made from alumi-num, calcium, lithium, magnesium, potassium, sodium and zinc or organic salts made from lysine, N,N'-dibenzylethyl-enediamine, diethanolamine, and ethylenediamine.

As used herein the term "derivative" refers to compounds having a functional parent molecule in the compound. For example, the term "polyethyleneimine derivative" includes all compounds having a functional polyethyleneimine com-pound as part of the compound. Examples of PEI derivatives include, but are not limited to, gallic amido PEI, PEI-maltose, and PEI-glucose, and MAXHT® 500. Examples of poly-acrylic acid derivatives include, but are not limited to, CYAN-AMER® P70 and P80. As another example, an "imidazole derivative" refers to imidazole isomers such as imidazoline or imidazolidine, as well as to substituted compounds thereof.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. Additionally, each numerical parameter should be construed in light of the number of significant digits and ordinary rounding approaches.

The present invention is directed to processes and reagents for the reduction and/or elimination of scale in wet-process phosphoric acid production. The organic/polymeric reagents can contain functional groups such as XO—R—OX, poly-mers (including, but not limited to, polyamines, polyacrylic acid and polymaleic acid and corresponding copolymers), and various amines (including, but not limited to, cyclic amines and/or diamines). The cyclic amines include any cyclic structure containing at least one nitrogen atom as part of the ring structure. In certain embodiments, for example, the cyclic amine includes 5- and 6-membered rings such as pyri-dine, piperidine, pyrrole, imidazole, imidazoline, triazole, and triazoline, and substitions thereof, wherein the substitu-ent is chosen from one or more of allyl, vinyl, alkyl, aryl, amino, carboxylic, phosphonyl or sulfonyl groups. A specific embodiment, for example, is ethylpyridine. In other embodi-ments, the cyclic amine includes, but is not limited to, bicyclic structures such as indole, purine, quinoline, quinoxaline, phenazine, or acridine.

In a preferred embodiment, the functional group XO—R—OX comprises an aromatic diol, wherein the aromatic ring can be at para, meta or ortho position and can be lower alkyl, aryl, amino, carboxylic, phosphonyl or sulfonyl group. In certain embodiments the aromatic diol is a compound of Formula (I):

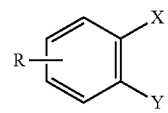

(I)

where the compound of the formula (I), has a molecular weight of about 3,000 or less; each of X and Y is selected from the group consisting of H, OH, $NH_2$, halides, SH, CN, CHO, COOH, $SO_3H$, and $PO_3H$; R includes a member chosen from H, $C_1$-$C_{10}$ alkyl, $C_6$-$C_{20}$ aryl, and $C_7$-$C_{20}$ aralkyl, which may also be substituted with one or more additional groups chosen from OH, $NH_2$, halides, SH, CN, CHO, COOH, $SO_3H$, $PO_3H$. In certain embodiments the molecular weight of a compound of Formula (I) is 1,000 or less.

Functional organic compounds suitable for use with the invention include, but are not limited to, one or more of catechol, dopamine, 2,3-Dihydroxybenzoic acid, 2,3-dihy-droxyphenyl acetic acid, Gallic acid, 3,4-Dihydroxycinnamic acid, 1-hydroxyethylidene-1,1-diphosphonic acid (HEDPA), Phosphinopolycarboxylic acid, sulfosuccinic acid, AeroDri® 104, Aero® 865, 4,5-Dihydroxynaphthalene-2,7-disulfonic acid disodium salt, Tannic phosphite and PEI-Epoxy-hydrox-ysuccinate.

Polyamines are either linear or branched $C_1$-$C_{12}$ alkyl, $C_6$-$C_{12}$ aryl, and $C_7$-$C_{12}$ aralkyl structures with multiple amines as functional groups or wherein the chemical reagents comprise a plurality of compounds of formula II:

(II)

wherein
$R_1$ is chosen from H, $C_1$-$C_{12}$ alkyl, and $C_1$-$C_{12}$ aryl;
$R_2$ is chosen from H, $C_1$-$C_{10}$ alkyl, $C_1$-$C_{10}$ aryl, and

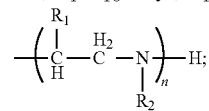

and
n=an integer from 2 to 200.

In certain embodiments the polyamines include, but are not limited to, polyalkyleneamines, which can be linear or cross-linked polyalkyl amines. The alkyl groups can include, for example, a lower alkyl such as a $C_1$-$C_4$ alkyl. In one embodiment, for example, the polyalkyleneimine is polyethyleneimine or derivative thereof, such as MAXHT®-500 (available from Cytec Industries Inc., Woodland Park N.J.). In other embodiments, the polyamine is chosen from SUPERFLOC® C573, or from other polyamines such as poly(diallyldimethylammonium chloride), such as SUPERFLOC® C587 (available from Cytec Industries Inc., Woodland Park N.J.).

Cyclic diamines is a specific class of cyclic amines and include compounds ranging from 4 membered to 14 membered cyclic (including bicyclic) structures with 2 nitrogen atoms in the rings that contain both saturated and unsaturated ring structures (Formula III). Cyclic diamines are well known to those of skill in the art and include, but are not limited to, imidazole, pyrazole, piperazine, pyrimidine, pyrazine, quinazoline, and phenazine. In certain embodiments the cyclic diamines include, but are not limited to, vinyl imidazole, ethylimidazole, Aeromine® 8651, 3000C (available from Cytec Industries Inc., Woodland Park N.J.), ethylpyrazine, 2-amino-4-methylpyrimidine, and 2-methyl-2-imidazoline.

In another aspect, the invention provides reagents for the scale control of an acid, comprising:

a compound of formula (I) and (II) being present in a ratio in the range of about 100:1 to about 1:100, respectively.

In still another aspect, the invention provides a compound of formula I and II blended with a compound of formula III, wherein the ratio of I/II:III is from 100:1 to 1:100.

Starting materials with two or more functional groups that appear in the formula (I), (II) and (III) can be chemically synthesized into one organic or polymeric compound.

The reagent comprising a compound of the formula I, II and III may optionally comprise additional ingredients. For example, in one embodiment the reagent includes a compound of the formula I, II and III and a liquid such as an alcohol and/or water as solvent. In another embodiment, the reagent includes a compound of the formula I, II and III in neat form. The ratio of blend of the formula I, II and III are in the range of about 10:1:1 to about 1:1:10, more preferably in the range of about 4:1:1 to about 1:1:4, even more preferably in the range of about 2:1:1 to about 1:1:2.

In one embodiment, the species of scale prevented or inhibited from forming during the phosphoric acid production process includes, but is not limited to, one or more of: $Si_2F_6$; $Na_2SiF_6$; $K_2SiF_6$; $CaSiF_6/2H_2O$; $CaF_2$; $MgF_2$; $CaSO_4/2H_2O$; $MgSiF_6/6H_2O$; $Mg_{0.8}Al_{1.5}F_6/X\,H_2O$ (wherein X is an integer ranging from 2 to 20); $MgH_2P_6O_7$; $CaSO_4$; $Al(PO_3)_3$; $NaK_2AlF_6$; $Ca_3(AlF_6)_2/4H_2O$; $MgNaAlF_6/2H_2O$; and $Ca_4SO_4AlSiF_{13}/10\,H_2O$.

In some embodiments, the reagents can be added at any step of the phosphoric acid production process, which steps are well known to those skilled in the art. In certain embodiments, for example, the adding step occurs at one or more of the milling step; the digesting step; the filtering step; the clarifying step; and the condensation/evaporation step of the phosphoric acid production process. In one embodiment the adding step occurs after the digesting step of the phosphoric acid production process. In another embodiment, the adding step occurs at the condensation/evaporation step of the process.

The reagent(s) may be intermixed in various ways, e.g., in a single stage, in multiple stages, sequentially, in reverse order, simultaneously, or in various combinations thereof. For example, in one embodiment, the reagent is added to form a pre-mix, then intermixed with the phosphoric acid. In another embodiment, the reagent is formed in situ by separately intermixing the components of the reagent with the phosphoric acid. Various modes of addition will be found to be effective.

The reagents that comprise a liquid (such as water, oil and/or alcohol) may be formulated in various ways, e.g., the solid reagent may be suspended (e.g., colloidal suspension), dispersed and/or slurried in the liquid, and/or the reagent may be suspended, dispersed, slurried and/or dissolved in the liquid. In one embodiment, the reagent is added separately to the phosphoric acid solution. In another embodiment, the reagent is premixed and added together to the phosphoric acid solution.

In one embodiment, each element of the scale inhibiting amount of reagent (e.g., aliphatic/aromatic compound having at least two hydroxyl groups+at least one amine) is provided at a concentration of from 10 to 1000 g per ton of phosphoric acid (e.g., 10 g/ton, 20 g/ton, 30 g/ton, 40 g/ton, 50 g/ton, 60 g/ton, 70 g/ton, 80 g/ton, 90 g/ton, 100 g/ton, 110 g/ton, 120 g/ton, 130 g/ton, 140 g/ton, 150 g/ton, 160 g/ton, 170 g/ton, 180 g/ton, 190 g/ton, 200 g/ton, 210 g/ton, 220 g/ton, 230 g/ton, 240 g/ton, 250 g/ton, 260 g/ton, 270 g/ton, 280 g/ton, 290 g/ton, 300 g/ton, 310 g/ton, 320 g/ton, 330 g/ton, 340 g/ton, 350 g/ton, 360 g/ton, 370 g/ton, 380 g/ton, 390 g/ton, 400 g/ton, 410 g/ton, 420 g/ton, 430 g/ton, 440 g/ton, 450 g/ton, 460 g/ton, 470 g/ton, 480 g/ton, 490 g/ton, 500 g/ton, 510 g/ton, 520 g/ton, 530 g/ton, 540 g/ton, 550 g/ton, 560 g/ton, 570 g/ton, 580 g/ton, 590 g/ton, 600 g/ton, 610 g/ton, 620 g/ton, 630 g/ton, 640 g/ton, 650 g/ton, 660 g/ton, 670 g/ton, 680 g/ton, 690 g/ton, 700 g/ton, 710 g/ton, 720 g/ton, 730 g/ton, 740 g/ton, 750 g/ton, 760 g/ton, 770 g/ton, 780 g/ton, 790 g/ton, 800 g/ton, 810 g/ton, 820 g/ton, 830 g/ton, 840 g/ton, 850 g/ton, 860 g/ton, 870 g/ton, 880 g/ton, 890 g/ton, 900 g/ton, 910 g/ton, 920 g/ton, 930 g/ton, 940 g/ton, 950 g/ton, 960 g/ton, 970 g/ton, 980 g/ton, 990 g/ton, 1000 g/ton of phosphoric acid). In another embodiment, each element of the reagent is provided at a concentration of from 50 to 300 g/ton of phosphoric acid. In a preferred embodiment, the concentration of each element of the reagent is 100 g/ton of phosphoric acid.

The treatment times may vary, depending in many cases on the nature of the scale formation rate and/or the species of the scale. For example, if the scale is formed within 30 minutes of the treatment, the overall treatment time may be just one hour. If the scale is not formed within 4 hours of the treatment, the overall treatment time may be over one day. One of ordinary skill in the art would be able to determine the applicable treatment time through routine means.

In one embodiment, the scale formed in the phosphoric acid production process is prevented or reduced from 10 to 180 days, depending on the amount and type of scale.

The pH of the phosphoric acid, although not adjusted, should not be altered by a value of 1 after the addition of the reagent for treatment. The preferred pH of the phosphoric acid should be in the range of 1-5 before starting the method of the invention. In case the pH of the phosphoric acid dropped below 1, it can be adjusted by sodium hydroxide or soda ash. In case the pH of the phosphoric acid rose above 5, it can be adjusted by addition of sulfuric acid or phosphoric acid.

In certain embodiments, after reagent treatment, the phosphoric acid may be subjected to additional processing steps in order to remove scale-causing metal ions. Thus, any desired processing steps may be performed on the treated phosphoric acid. For example, the phosphoric acid may be flocculated. Alternatively or additionally, the phosphoric acid may be leached. The phosphoric acid may also be treated with a reagent that causes precipitation of the scale-causing metal ions, which are subsequently removed by a filtration stage.

Suitable agents for carrying out these additional steps are well known to those of skill in the art.

Other Embodiments

1. A process for inhibiting or eliminating scale formation during wet-process phosphoric acid production comprising:
adding to a wet-process phosphoric acid production stream a scale inhibiting amount of a reagent comprising
   i) from about 10 to about 1000 grams per ton of $P_2O_5$ by weight of an aliphatic or aromatic compound containing at least two hydroxy groups; and
   ii) from about 10 to about 1000 grams per ton of $P_2O_5$ by weight of at least one amine.
2. The process according to embodiment 1, wherein the reagent further comprises a polymer.
3. The process according to embodiment 1 or 2, wherein the aliphatic or aromatic compound containing at least two hydroxyl groups is an aromatic compound of formula I:

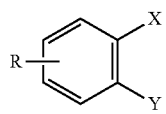

Formula (I)

having a molecular weight of about 3,000 or less, and
wherein each of X and Y is selected from the group consisting of H, OH, $NH_2$, halides, SH, CN, CHO, COOH, $SO_3H$, and $PO_3H$; and
R is chosen from a member of the group consisting of H, $C_1$-$C_{10}$ alkyl, $C_6$-$C_{20}$ aryl, and $C_7$-$C_{20}$ aralkyl.
4. A process according embodiment 3, wherein the aliphatic or aromatic compound of Formula I has a molecular weight of 1,000 or less.
5. The process according to embodiment 3, wherein R is substituted with one or more substituent chosen from: OH, $NH_2$, halides, SH, CN, CHO, COOH, $SO_3H$, $PO_3H$.
6. The process according to embodiment 3, wherein each of X and Y is OH.
7. The process according to any one of embodiments 1-6, wherein the aromatic compound of formula I is selected from the group consisting of 3,4-Dihydroxyphenylacetic acid, Catechol, Pyrogallol, ascorbic phosphite, Tannic phosphite, dopamine HCl, tannic acid, glucolyzed dopamine, 3,4-Dihydroxyhydrocinnamic acid, Caffeic acid, Gallic acid, and 3,4-Dihydroxybenzonitrile.
8. The process according to embodiment 1 or 2, wherein the aliphatic or aromatic compound containing at least two hydroxyl groups is an aliphatic compound chosen from: a mono-, di-, or polysachharide selected from the group consisting of chitosan, glucose, maltose, and lactose.
9. The process according to any one of embodiments 1-8, wherein the amine is triethanolamine or 1,2-phenylenediamine.
10. The process according to any one of embodiments 1-8 wherein the amine is a linear or branched polyamine of Formula II:

(II)

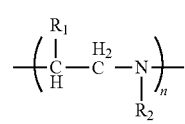

wherein
$R_1$ is chosen from H, $C_1$-$C_{12}$ alkyl, and $C_1$-$C_{12}$ aryl;
$R_2$ is chosen from H, $C_1$-$C_{10}$ alkyl, $C_1$-$C_{10}$ aryl, and

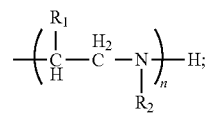

and
n=an integer from 2 to 200.
11. A process according to embodiment 10, wherein the polyamine is chosen from polyethyleneimine or a derivative thereof; MAXHT®-500; SUPERFLOC® C573, and C587.
12. A process according to any of embodiments 1-8, wherein the amine is a cyclic diamine chosen from imidazole; pyrazole; pyrimidine; purine; pteridine; quinoxaline; and derivatives thereof.
13. A process according to embodiment 12, wherein the cyclic diamine is chosen from: imidazoline; ethylene bis-imidazoline; vinylimidazole; ethylimidazole; ethylpyrazine; 2-amino-4-methylpyrimidine; 2-methyl-2-imidazoline; Aeromine® 3000C; and mixtures thereof.
14. The process according to any of embodiments 1-8, wherein the amine is a cyclic amine selected from the group consisting of pyrrole; pyridine; indole; quinoline; and derivatives thereof.
15. The process according to embodiment 14, wherein the pyridine derivative is 2,2'-Bipyridine; ethylpyridine; and mixtures thereof.
16. The process according to embodiment 2, wherein the polymer is chosen from a member selected from the group consisting of: polyacrylate, polyacrylamide, polyacrylic acid; CYANAMER® P-70; CYANAMER® P-80; poly(maleic anhydride-acrylic acid); and derivatives thereof.
17. A process according to embodiment 1, wherein the reagent comprises an aromatic diol, a polyamine, and a cyclic amine.
18. A process according to embodiment 17, wherein the reagent comprises a catechol, polyethyleneimine or derivative thereof, and a vinylimidazole.
19. A process according to embodiment 18, wherein the reagents are blended at a ratio of 1:1:1.
20. A process for inhibiting or eliminating scale formation during wet-process phosphoric acid production comprising: adding a scale inhibiting amount of a reagent chosen from: SUPERFLOC® C573; SUPERFLOC® C587; polyethyleneimine oligomer; MAXHT® 500; and mixtures thereof.

EXAMPLES

The following examples are provided to assist one skilled in the art to further understand embodiments of the present invention. These examples are intended for illustration purposes and are not to be construed as limiting the scope of the embodiments of the present invention or the claims appended hereto.

Phosphoric acid solutions used for reagent testing are obtained from phosphoric acid plants located in Canada (Plant A); Belgium (Plant P); and Florida (Plant M) at 28%, 42%, 52% or 69% $P_2O_5$. ICP and XRD analysis shows the crude phosphoric acids differ greatly in their metal components, and this sometimes leads to difficulty in forming scale within a reasonable period. Accordingly, the scale formation is sometimes induced with salts. In some cases, 0.1% to 10% NaCl, KCl or $MgCl_2$ salts are added to induce particular scale formation. These crude samples contained 28% and 69% $P_2O_5$ from Plant A, 30% and 54% $P_2O_5$ from Plant P and 30% $P_2O_5$ from Plant M. These samples are used as is or diluted to proper concentration by adding water, or adjusted to more concentrated solution by adding 86% commercial grade phosphoric acid. In some cases, 0.1% to 3% NaCl, KCl or $MgCl_2$ salts are also added to induce particular scale formation during testing.

Scale was induced in the following manner:

Step 1: Acid preparation—In this step, crude phosphoric acid is obtained from phosphoric acid plants and is treated properly (as is, diluting, concentrating or adding salt as scale initiator) before placing into the jacket beakers (60° C. to 80° C.) for 0.5 to 2 hours.

Step 2: Testing equipments set up and chemical addition—After the treatment, proper dosages of the reagents are added to the phosphoric acid and agitated using stir bar while being heated by water circulator at 60° C. to 90° C. In the meantime, a 316L stainless steel tube is placed in each beaker along with the cover and plastic tubings for water inlet and outlet. Alternatively, a graphite tube or a 904L stainless steel tube can be used and the temperature for the tube can be 110° C. to 130° C.

Step 3: Scale formation—If a reagent to prevent or reduce scale is used, it can be added just before the conditioning (generally the additive is used as a solution containing 1-10% of active reagent). This solution is put into the treated phosphoric acid in the jacketed beaker and is heated with agitation at 60° C. to 80° C. for 30 minutes before the tube waster is turned on and kept at that temperature for 2-12 hours. Two to nine such tests (beakers) are done at one time. At the end of the test, the tube is thoroughly rinsed and dried in an oven (80° C.) for 1-2 hours.

Step 4: Weighing and analysis of the scale—Considerable scale is observed to form on the steel tube. The weight gain of the steel tube is a measure of the amount of scaling. The weight of scale formed is expressed as a percentage of the average weight that formed on the blanks (i.e, no reagent is used) that were part of the same set of tests. Similarly, the total amount of scale is also a measure of antiscalant activity and this may be expressed as a percentage of the total weight that formed in the blank experiments that were part of the same set of tests. The scale is also analyzed by ICP and XRD for metal ion and component information.

This test method is preferred because other test methods collect both the scales and the insolubles, although the insoluble may be free flowing in the acid stream in the real plant and thus not contribute as significantly to the scale growth. In this test, the scale is collected on the outside surface of the stainless steel tubes. The tubes are weighed and compared to the tubes without reagent treatment to calculate the scale changes. The reagents are usually prepared in deionized ("DI") water for final of 3% concentration for testing. Unless it is stated otherwise, the concentration reagent in the testing solution is at a maximum of 2000 ppm.

Care must be taken to ensure all the parameters, such as but not limited to, mixing rate, tube temperature, jacket temperature, tube surface quality, tube volume submerged, stir bar size and acid quality, are close to one another, so that the result of scale inhibition comparison with the control sample will be meaningful.

The compound or mixture with a blend of the formula I, II and III is preferably selected to achieve greater scale inhibition than other reagents during the test. During each test, a control beaker (no reagent) is always present to compare with other beakers, where various reagents are present, for the scale-inhibition effect.

The scale is collected on the outside surface of the stainless steel tubes. They are weighed and compared to the tubes without reagent treatment to calculate the scale changes. The reagents are usually prepared in DI water for final of 3% concentration for testing. Unless it is stated otherwise, the concentration reagent in the testing solution is at maximum of 2000 ppm.

Example A

Scale Initiation

Four jacketed-beakers are positioned and clamped on top of an aluminum tray filled with DI-water over the four corners of the hot plates. The beakers are connected in parallel in respect to the water flow from the heating circulator. Phosphoric acid (synthetic or crude plant acid sample at 28%) is mixed well before evenly dividing into 4 beakers (450-700 g). The beakers are mixed simultaneously by stir bars at the same speed. The hot plate is turned on to heat the water bath to a temperature of about 90° C. After the mixing in each beaker is stabilized, the power of the heating circulator is started. Once the temperature of the circulator reads about 50-60° C., reagents are then added to the individual beaker (usually to three of them with remaining one as control).

The four pre-weighed U-shape tubes with series connection to tap water are then submerged into corresponding beaker. Once the circulator reads about 75° C., the tap water is turned on to cool the U-shape tubes. The end of the tap water temperature coming out of the last U-shape tube is about 25° C. The mixing in each beaker is continued and carefully monitored for occasional stops. All tap water and heating water connections are monitored frequently for possible leaking and disconnection.

After a two hour treatment (or until there is visible scale formed on the tubes), the heating for the jacket and cooling water for the tubes are turned off along with the stirring and heating for the hot plate. The tubes are disconnected and rinsed in a beaker with 500 ml DI water to remove the residual phosphoric acid on the tubes. The tubes are then dried in an oven for 1 hour at 80° C. and cooled to room temperature before they are weighed to find out scale weight on the tubes by the following equation: Percent scale reduction (increase) =100×(Wt of scale w/reagent−Wt of scale w/o reagent)/(Wt of scale w/o reagent). ICP analysis and XRD analysis is used to identify the components in the acids and scale.

After the scale study is complete, the beakers are removed with clamps attached and used acid solutions are poured into a waste container. The beakers are cleaned and returned to their original positions for the next run. The stainless steel tubes are cleaned, oven dried, and weighed before reused for the next run.

Reagents Selection and Testing

Examples 1-30

Reagents can be either purchased from commercial sources or synthesized in the lab.

The reagents are all dissolved in water to prepare for 3% solution before the test.

There are 10 functional organic compounds (A1 to A10), 7 polymers (B1 to B7) and 7 amine-type compounds (C1 to C7) listed below. In order to test their blend property, random combination and ratios of series A, B and C were generated. The examples of reagents suitable in the DOE are listed in Table 1.

TABLE 1

Examples of Reagents and their categorization for the DOE blend optimization experiments

| Reagent number | Functional organic compounds A | Polymers B | amines and cyclic amines C |
|---|---|---|---|
| 1 | catechol | PEI | vinylimidazole |
| 2 | 1-Hydroxyethane-(1,1-di-phosphonic acid) (HEDP) | SUPERFLOC ® C573 | ethylimidazole |
| 3 | sulfosuccinic acid (AeroDri 104) | SUPERFLOC ® C587; Poly(diallyldimethylammonium Chloride | ethylpyridine |
| 4 | 3-Sulfopropyl acrylate potassium salt | Polyacrylic acid | Ethylpyrazine |
| 5 | 4,5-Dihydroxynaphthalene-2,7-disulfonic acid disodium salt | CYANAMER ® P-70 Polyacrylamide and acrylic acid copolymer | 2-amino-4-methylpyrimidine |
| 6 | tannic phosphite | CYANAMER P-80 (SASMAC) malice anhydride and allylsulphonic acid | 2-methyl-2-imidazoline |
| 7 | hydroxypolyethylenimino succinate | polyMA-AA | Aeromine ® 3000C |
| 8 | 2-phosphonobutane-1,2,4-tricarboxylic acid (PBTC) | | |
| 9 | 3,4-Dihydroxyhydrocinnamic acid | | |
| 10 | Tartaric acid | | |

As indicated below, Formula A1, B1 and C1 blended in a 1:1:1 ratio inhibits all the scale (−100% vs. blank sample) for phosphoric crude acid. The scale inhibitor blends (functional compounds, polymers, and amines represented by formula A, B and C), which are derived from three key scale inhibition mechanisms (chelation/threshold inhibition, morphology modification, and dispersant), are further investigated in order to find the optimal combination and ratio of a blend for scale inhibition.

The test results using A1, B1 and C1 reagents are listed below (Table 2):

TABLE 2

Test results using A1, B1, C1 blend

| Examples | Reagent | Dosage, mg/l | Percent Scale inhibition on Tube % vs. blank |
|---|---|---|---|
| 1 | Formula A1, B1 and C1 (1:1:1) blend | 100 | −100 |
| 2 | Formula A1, B1 and C1 (4:1:1) blend | 100 | −48 |
| 3 | Formula A1, B1 and C1 (1:4:1) blend | 100 | −97 |
| 4 | Formula A1, B1 and C1 (1:1:4) blend | 100 | −33 |

The investigation is carried out by following the Design of Experiment (DOE). The results are summarized in the following table (Table 3):

TABLE 3

DOE result for blend optimization experiments.

| Example | Functional organic compounds | Polymers | amines and cyclic amines | A ratio | B ratio | C ratio | % scale inhibition vs. control |
|---|---|---|---|---|---|---|---|
| 5 | A4 | B1 | C7 | 0.45 | 0.10 | 0.45 | −46 |
| 6 | A7 | B4 | C1 | 0.44 | 0.31 | 0.25 | −97 |
| 7 | A2 | B7 | C2 | 0.8 | 0.1 | 0.1 | −57 |
| 8 | A2 | B4 | C3 | 0.1 | 0.8 | 0.1 | −52 |
| 9 | A4 | B4 | C4 | 0.1 | 0.38 | 0.52 | −59 |
| 10 | A6 | B4 | C7 | 0.8 | 0.1 | 0.1 | −25 |
| 11 | A10 | B7 | C5 | 0.31 | 0.1 | 0.59 | −49 |
| 12 | A9 | B6 | C6 | 0.45 | 0.45 | 0.1 | −85 |
| 13 | A3 | B5 | C6 | 0.52 | 0.1 | 0.38 | −56 |
| 14 | A4 | B5 | C5 | 0.34 | 0.34 | 0.32 | −85 |
| 15 | A7 | B2 | C6 | 0.1 | 0.1 | 0.8 | −68 |
| 16 | A2 | B6 | C1 | 0.38 | 0.1 | 0.52 | −59 |
| 17 | A8 | B3 | C5 | 0.1 | 0.8 | 0.1 | −97 |
| 18 | A1 | B1 | C5 | 0.1 | 0.45 | 0.45 | −100 |
| 19 | A5 | B5 | C2 | 0.45 | 0.45 | 0.1 | −69 |
| 20 | A8 | B7 | C3 | 0.35 | 0.27 | 0.38 | −35 |
| 21 | A9 | B2 | C2 | 0.1 | 0.52 | 0.38 | −36 |
| 22 | A1 | B6 | C2 | 0.1 | 0.8 | 0.1 | −100 |
| 23 | A5 | B7 | C1 | 0.1 | 0.8 | 0.1 | −46 |
| 24 | A6 | B1 | C4 | 0.33 | 0.42 | 0.25 | −96 |
| 25 | A1 | B1 | C7 | 0.33 | 0.34 | 0.33 | −96 |
| 26 | A1 | B1 | C2 | 0.33 | 0.34 | 0.33 | −83 |
| 27 | A1 | B1 | C3 | 0.33 | 0.34 | 0.33 | −97 |
| 28 | A1 | B2 | C1 | 0.33 | 0.34 | 0.33 | −90 |
| 29 | A1 | B2 | C7 | 0.33 | 0.34 | 0.33 | −89 |
| 30 | A1 | B2 | C3 | 0.33 | 0.34 | 0.33 | −99 |

All the blends in these examples contain a functional organic compound, a polymer, and a cyclic amine.

The results show that more than one blend can inhibit scale completely from certain low concentrate phosphoric acid.

The phosphoric acids used here were low concentrate crude phosphoric acid (28 to 33% $P_2O_5$) and 10-29% NaCl and KCl are used as scale initiator.

Examples 31 to 34

Sodium chloride or potassium chloride are added as scale initiators to a crude acid (30% $P_2O_5$) obtained from Plant M. The results are summarized in Table 4.

TABLE 4

Reagent performance on salt initiated scale formation (100 ppm dose)

| Examples | Reagent | Scale change Comparing to blank (%) |
|---|---|---|
| 31 | Poly(diallyldimethylammonium Chloride | −34 |
| 32 | Superfloc ® C573 (available from Cytec Industries Inc., Woodland Park NJ) | −57 |
| 33 | Polyethylenimine oligomer | −31 |
| 34 | MaxHT ® 500 (available from Cytec Industries Inc., Woodland Park NJ) | −29 |

Examples 35-47

Additional data using other blended reagents is provided below in Table 5.

TABLE 5

| Examples | Reagent blend (1:1:1) | Scale change Comparing to blank (%) |
|---|---|---|
| 35 | Dopamine HCl + PEI + vinylimidazole | −100 |
| 36 | 3,4-dihydroxycinamic acid + catechol + PEI | −100 |
| 37 | Dopamine + Gallic amido PEI | −87 |
| 38 | Bicyclopentadienyl Titanium chloride + AlCl3 + hexaamine CoCl | −85 |
| 39 | Gallic amido PEI/ vinylimidazole | −78 |
| 40 | vinylimidazole + PEI + hexamethyltetraamine | −78 |
| 41 | vinylimidazole + PEI + dipyridal | −64 |
| 42 | PEI + dipyridal + bicyclopentadienyl TiCl | −62 |
| 43 | Gallic amido PEI/dopamino glucose | −57 |
| 44 | t-butylphosphonic acid + P-80 + Bardac 2050 (available from Lonza, Basel, Switzerland) | −56 |
| 45 | Gallic amido PEI/dopamino glucose | −55 |
| 46 | Tartaric acid + catechol + pyrogallol | −51 |
| 47 | Chitosan + Tetraethylenepentamine (TEPA) + Lactose | −50 |

Example 48

Evaluation of Scale Inhibition in the Filtration Unit of a Wet-Process Phosphoric Acid Production Plant Phosphate ore and sulfuric acid are reacted in the Digestion tank of a wet-process phosphoric acid production plant. The by-product is then filtered at the plant Filtration unit and then sent to Clarifier and Evaporating units to make 42%, 52%, and 70% phosphoric acid.

Following filtration, but before being sent to the Clarifier, a reagent comprising the formula according to Example 1 is fed into the filtered acid solution at the suction part of the pump. The reagent flow rate is adjusted to 100 ppm, or about 100 ml of reagent/min. adjusting the density of the reagent and flow rate of the acid. The plant trial is performed for 1 week.

After the trial, the spool pipes positioned over the Clarifier are weighed as the amount of scale formed in the spools provides the most indicative evidence for scale formation. The spool weight for pump #1 following the trial is 0.5 lbs for the North Clarifier and 4 lbs. for the South Clarifier. The spool weight for pump #2 following the trial is 1 lb. for the North Clarifier and 1 lb. for the South Clarifier.

Compared to the weight of the spools before treatment with the reagent according to the formula of Example 1 (each spool containing about 13 lbs. of scale), the weight of the spools following reagent treatment shows that the reagent is effective in inhibiting and/or reducing the amount of scale formed by phosphoric acid.

Various patent and/or scientific literature references have been referred to throughout this application. The disclosures of these publications in their entireties are hereby incorporated by reference as if written herein to the extent that such disclosures are not inconsistent with the invention and for all jurisdictions in which such incorporation by reference is permitted. In view of the above description and the examples, one of ordinary skill in the art will be able to practice the disclosure as claimed without undue experimentation.

Although the foregoing description has shown, described, and pointed out the fundamental novel features of the present teachings, it will be understood that various omissions, substitutions, and changes in the form of the processes as illustrated, may be made by those skilled in the art, without departing from the scope of the present teachings. Consequently, the scope of the present teachings should not be limited to the foregoing discussion, but should be defined by the appended claims.

What is claimed is:

1. A process for inhibiting or eliminating scale during wet-process phosphoric acid production comprising:
    adding to a wet-process phosphoric acid production stream a scale inhibiting amount of a reagent comprising
    i) from about 10 to about 1000 grams per ton of $P_2O_5$ by weight of an aromatic compound according to Formula (I)

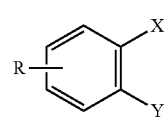

(I)

wherein
    each of X and Y is independently selected from the group consisting of H, OH, $NH_2$, halides, SH, CN, CHO, COOH, and $PO_3H$; and
    R is chosen from H or selected from the group consisting of $C_1$-$C_{10}$ alkyl, $C_6$-$C_{20}$ aryl, and $C_7$-$C_{20}$ aralkyl, wherein said group is optionally substituted with one or more substituents selected from the group consisting of OH, $NH_2$, halogen, SH, CN, CHO, COOH, and $PO_3H$; and
    wherein the compound contains at least two hydroxyl groups, and has a molecular weight of 3,000 Da or less; and
    ii) from about 10 to about 1000 grams per ton of $P_2O_5$ by weight of at least one amine, thereby inhibiting or eliminating scale in said phosphoric acid production process.

2. The process according to claim 1, wherein the reagent further comprises a polymer selected from the group consisting of polyacrylate; polyacrylamide; polyacrylic acid; acrylamide/acrylate copolymer; allyl sulfonic acid/maleic anhydride copolymer; poly(maleic anhydride-acrylic acid); and mixtures thereof.

3. A process according claim 1, wherein the aromatic compound of Formula I has a molecular weight of 1,000 Da or less.

4. The process according to claim 1, wherein R is a substituted $C_1$-$C_{10}$ alkyl, $C_6$-$C_{20}$ aryl, or $C_7$-$C_{20}$ aralkyl.

5. The process according to claim 1, wherein each of X and Y is OH.

6. The process according to claim 1, wherein the aromatic compound of Formula (I) is selected from the group consisting of 3,4-Dihydroxyphenylacetic acid, Catechol, dopamine HCl, glucolyzed dopamine, 3,4-Dihydroxyhydrocinnamic acid, Caffeic acid, and 3,4-Dihydroxybenzonitrile.

7. The process according to claim 1, wherein the amine is triethanolamine or 1,2-phenylenediamine.

8. The process according to claim 1, wherein the amine is a linear or branched polyamine of Formula II:

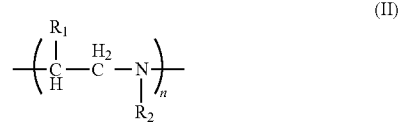

(II)

wherein
$R_1$ is chosen from H, $C_1$-$C_{12}$ alkyl, and $C_6$-$C_{12}$ aryl;
$R_2$ is chosen from H, $C_1$-$C_{10}$ alkyl, $C_6$-$C_{10}$ aryl,

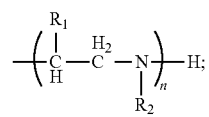

or wherein $R_1$ and $R_2$ are as defined for Formula II; and n=an integer from 2 to 200.

9. A process according to claim 8, wherein the polyamine is polyethyleneimine or a derivative thereof.

10. A process according to claim 1, wherein the amine is a cyclic diamine selected from the group consisting of imidazole; pyrazole; pyrimidine; purine; pteridine; quinoxaline; and derivatives thereof.

11. A process according to claim 10, wherein the cyclic diamine is selected from the group consisting of imidazoline; ethylene bis-imidazoline; vinylimidazole; ethylimidazole; ethylpyrazine; 2-amino-4-methylpyrimidine; 2-methyl-2-imidazoline; and mixtures thereof.

12. The process according to claim 1, wherein the amine is a cyclic amine selected from the group consisting of pyrrole; pyridine; indole; quinoline; and derivatives thereof.

13. The process according to claim 12, wherein the pyridine derivative is 2,2'-Bipyridine; ethylpyridine; and mixtures thereof.

14. A process according to claim 1, wherein the reagent comprises an aromatic diol, a polyamine, and a cyclic amine.

15. A process according to claim 14, wherein the aromatic diol is catechol, the polyamine is polyethyleneimine or derivative thereof, and the cyclic amine is vinylimidazole.

16. A process according to claim 15, wherein the reagents are blended at a ratio of 1:1:1 by weight.

17. A process for inhibiting or eliminating scale formation during wet-process phosphoric acid production comprising: adding to a wet-process phosphoric acid production stream a scale inhibiting amount of a reagent selected from the group consisting of poly-dimethylamine epichlorohydrin ethylenediamine; poly-diallyl dimethyl ammonium chloride; polyethyleneimine; a silane-functionalized polyamine; and mixtures thereof, thereby inhibiting or eliminating scale from said phosphoric acid production process.

18. A process according to claim 17, wherein the reagent is present in an amount from 10 to 1000 grams per ton of $P_2O_5$.

19. A process according to claim 18, wherein the reagent is polyethyleneimine.

20. A process according to claim 19, wherein the polyethyleneimine has a weight average molecular weight from 600 to 2500 Daltons.

21. A process according to claim 18, wherein the reagent is poly-diallyl dimethyl ammonium chloride.

22. A process according to claim 1, wherein the amine is selected from the group consisting of silane-funtionalized polyamine; poly-dimethylamine epichlorohydrin ethylenediamine; poly-diallyl dimethyl ammonium chloride; and mixtures thereof.

23. A process according to claim 19, wherein the polyethyleneimine is branched.

24. A process according to claim 23, wherein the branched polyethyleneimine has a molecular weight from 600 to 2500 Daltons.

* * * * *